Dec. 23, 1969  D. A. CHALMERS ETAL  3,486,138
ELECTROMAGNETIC SWITCHES UTILIZING REMANENT MAGNETIC MATERIAL
Filed April 14, 1966  4 Sheets-Sheet 1
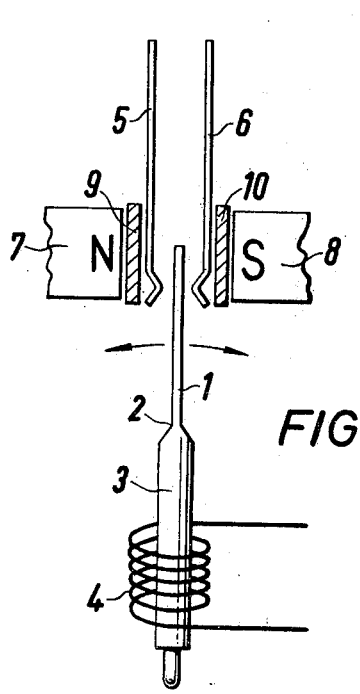
FIG.1.
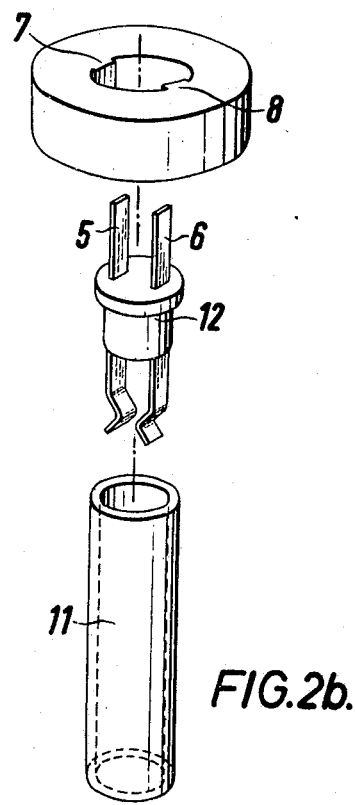
FIG.2b.
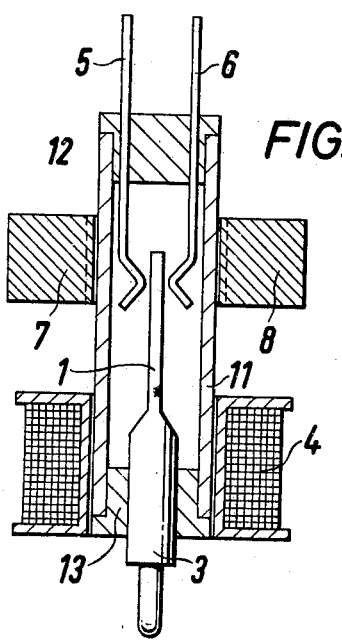
FIG.2a.
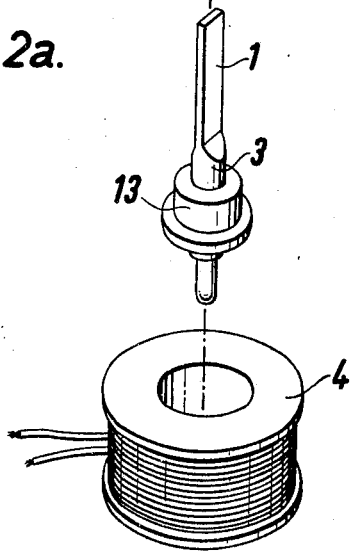
INVENTORS
DAVID ARTHUR CHALMERS
HAROLD JOHN CLEMENTS
BY
Cushman, Darby & Cushman
ATTORNEYS

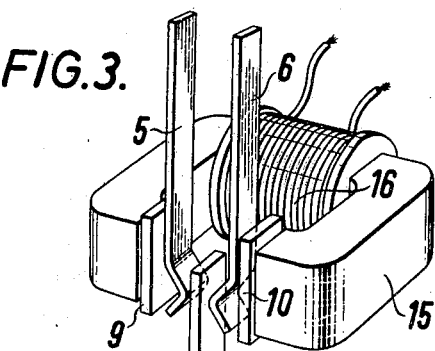
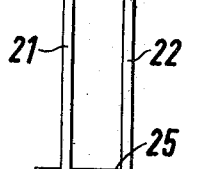
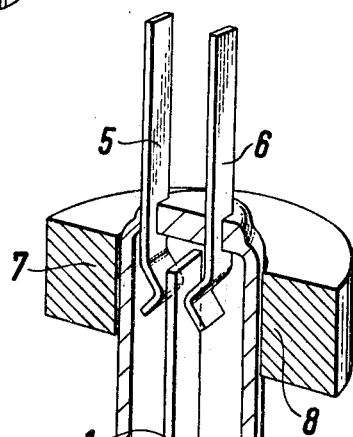

INVENTORS
DAVID ARTHUR CHALMERS
HAROLD JOHN CLEMENTS
By Cushman, Darby & Cushman
ATTORNEYS

United States Patent Office 3,486,138
Patented Dec. 23, 1969

3,486,138
ELECTROMAGNETIC SWITCHES UTILIZING REMANENT MAGNETIC MATERIAL
David Arthur Chalmers and Harold John Clements, London, England, assignors to Modern Precision Engineers (Finchley) Limited, London, England, a corporation of Great Britain
Filed Apr. 14, 1966, Ser. No. 542,633
Claims priority, application Great Britain, Apr. 30, 1965, 18,380/65; June 4, 1965, 23,865/65; Aug. 19, 1965, 35,543/65, 35,544/65
Int. Cl. H01h 1/66, 51/00
U.S. Cl. 335—151                                    4 Claims

ABSTRACT OF THE DISCLOSURE

A bistable electromagnetic switch with a pair of fixed contacts and a contact member movable into electrical connection with one or the other of the fixed contacts. A magnetic field of fixed polarity and a magnetic field of reversible polarity are both applied to the movable contact member so that the member is latched to one or the other of the contacts when a core or remanent material, which may be part of the movable member, is switched by the reversible magnetic field. Embodiments disclosed include the use of permanent magnets as fixed contacts, a remanent pellet which is switched between the opposed poles of two permanent magnets, and a rotary disc which is rotated to open and close contacts.

---

This invention relates to electromagnetic switches and it aims to provide switching components having stable bipolar latching properties, relatively high speed operation, structural simplicity and a high degree of circuit compatibility.

In many electrical and electronic circuit systems there arises a requirement for remotely operated relay switching where speed of operation and economy in the power used are factors of importance. In particular, where conventional relays are used in large numbers as is the case in telephone switching networks or in data processing and logic systems a high demand of power can arise to maintain switches in the operated position and conventional systems are limited in speed of operation.

In data storage systems conventional relays in most cases require to be continuously energised to maintain storage and will lose stored data in the event of a failure in the energising power. This is also the case in systems which embody semi-conductor switching techniques.

The present invention seeks to overcome these disadvantages and to effect substantial economy in the power required and in the necessary circuitry and in many instances to eliminate the requirement for holding current to be provided.

The invention accordingly provides an electro-magnetic switch bistable in two contact positions comprising a contact member, means for applying a magnetic field of fixed polarity to said contact member and remanent magnetic means of reversible polarity forming the whole or part of, or acting on, said contact member to switch said member in latching relation with either one of said contact positions. The switch may be arranged so that movement of the contact member to or towards either of its polar positions operates another contact or contacts.

In one embodiment of the invention the contact member comprises an armature in the form of a reed of conductive material the whole or part of which is comprised of a core of remanent material with at least one inductive coil disposed to influence the core, means being provided for reversing electrical pulses through the said coil or coils, and magnet means being arranged adjacent the contacts at said contact positions to provide a magnetic field between said contacts and across the reed. Alternatively, the contact member may comprise a reed member in the form of a permanent magnet of fixed polarity with remanent core means having at least one inductive coil wound thereon adjacent contacts at said contact positions, means being provided for reversing electrical pulses through said coil or coils. The reed and the contacts may be enclosed in an envelope or cartridge of plastic or other insulating material and the contact member is preferably flexible.

In a further embodiment the contact member takes the form of a rod or pellet of remanent material freely movable within an inductive coil or coils and means are provided for applying electrical pulses of reversible polarity to said coil or coils, magnet means having provided at either end of said rod or pellet having poles of like polarity facing said ends.

In yet a further embodiment a moving member in the form of a magnet of fixed polarity is mounted within the field of a magnetic system having a core of remanent material and at least one induction coil and having means passing through said coil electrical pulses of reversible polarity, one pole of said moving member engaging one or other of a pair of contacts in latching relation. The said moving member may be in mechanical engagement with a rotor disc, means being provided on said disc for engaging one or more contact elements in latching relation in two contact positions.

It is an important feature of the invention that electrical connections may be provided between contacts which are engaged in latching relation and the ends of an inductive coil or coils providing the means of reversible polarity whereby the switch operates from or through its own contacts. This property of the invention enables the device to be employed with utmost simplicity as a bistable element for circuit systems.

In order that the invention may be clearly understood and readily carried into effect the same will now be described with reference to the accompanying drawings in which:

FIG. 1 is a schematic view of a switch in accordance with the invention.

FIG. 2a shows a cross section of the switch in a more practical form.

FIG. 2b is an exploded view of FIG. 2a.

FIG. 3 is a perspective view of a modification of FIG. 1.

FIG. 4 is a cross section of a further modification.

FIG. 5 is a cross section and perspective view with parts of a more sophisticated version of the switch.

Figure 6A:
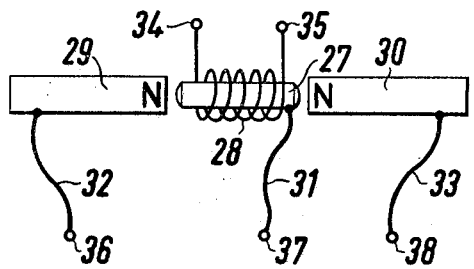
FIGS. 6a and 6b are a schematic view and perspective view respectively of a further modification of the invention.

Referring first to FIG. 1 a flexible reed member 1 of conductive and magnetically permeable material is joined at 2 to a core 3 of remanent material of high coercivity such as a cobalt-iron-vanadium alloy. The core 3 is wound with an inductive coil 4 which is connected to a source of electrical pulses which source has means for reversing the polarity of the pulses supplied to the coil 4. The end of the reed member 1 remote from the core 3 is disposed between the contacts 5 and 6. A permanent magnet or magnets having poles of opposite polarity 7, 8 is disposed to provide a magnetic field across the contacts 5 and 6 and the tip of the reed 1. Isolator strips 9, 10 of insulating material are advantageously provided between the magnet poles 7, 8 and the contacts 5, 6. The permanent magnet poles 7, 8 are so positioned that a plane connecting them is perpendicular to and intercepting with the principal axis of the reed 1. The magnet poles are also positioned so as to exert a polar influence on the respective regions of contacts 5 and 6. Between contacts 5 and 6 and the associated magnet poles the isolator strips 9, 10 of insulating material are positioned so as to effect electrical insulation of the contacts 5, 6 with respect to the magnet poles 7, 8.

In considering the structure as above described, and illustrated in FIG. 1, it will be observed that it will be possible, during the assembly stage, to adjust the flexible reed member 1 into a central position, with respect to contacts 5, and 6 in a position of unstable equilibrium.

The degree of instability will be subject to the property of stiffness of contact 1 and the magnitude of any disturbing force affecting the system.

When a D.C. current pulse (of a duration and magnitude sufficient to induce magnetic polarization in the remanent material of core 3) is applied to the coil winding 4 the free end of the armature contact 1 will move in a direction corresponding to the overall magnetic state of the system at that time.

This movement will result in connection in either 5–1 or 6–1 switch mode, according to the polarity of the applied voltage, and the connection thus established will be maintained in stability by the permanent magnetic state as now established.

If a second current pulse, of opposite polarity to a pulse previously used, be applied to the energizing coil the contact position will be correspondingly reversed.

The duration and magnitude of the energizing pulse need be related only to the requirements for excitation of an adequate magnetic field in the remanent material of the core 3. Since this excitation results in permanent polarization the transit time of contact movement may be disregarded, and the movement will always continue regardless of the subsidence of the energizing pulse.

When a switching state is established in the mechanism that state will be stable to the extent that, even if the movable contact be forcibly disturbed from connection, the connection will be restored when the disturbing force subsides.

FIGURES 2a and 2b illustrate a more practical version of the arrangement shown in FIG. 1 in which the isolator strips 9, 10 are replaced by a sealing envelope or cartridge 11 of insulating material such as plastic or glass. Apart from this like references to those used in FIG. 1 denote like parts. Sealing beads 12, 13 are provided at the upper and lower ends respectively of the envelope 11.

Referring to the perspective view in FIG. 3, 14 is a flexible reed member in the form of a magnet of fixed polarity having a N pole at one end and a S pole at the other end thereof. Surrounding the contacts 5, 6 and the isolator strips 9, 10 is a remanent core 15 having a winding 16 thereon which is connected to a source of electrical pulses which fs adapted to reverse the polarity of the pulses. In this arrangement the operation of the device depends upon the reversible polarity of the poles in the core 15 acting on the fixed polarity of the tip of the reed member 14.

FIG. 4 shows in cross-section a modification of the construction of FIGS. 1 to 3. The flexible reed 16, one end of which passes through and is secured by end cap 17 is constructed of non-ferrous conductive metal and is slotted to contain the remanent core 18. The upper end of the reed is located between the opposed magnetic poles 19, 20 of small permanent magnets in which are embedded the output connections 21, 22 of the device. An insulating and locating separator 23 is affixed between the pole magnets. The device is enclosed in a glass tube 24 sealed at the upper end by sealing compound 25 or by an end cap similar to the cap 17. An energising coil 26 for the remanent core 18 is located coaxially with and adjacent said core outside the tube 24 and is connected to a reversible source of electrical pulses (not shown). In this instance it will be seen that the permanent magnet poles 19, 20 serve as the contacts for the reed member 16.

Referring now to FIG. 5 the reed member 1 is constructed of ferrous magnetically permeable conductive material and is provided with a lug 1a which may be used as a connection to a source of electrical pulses. The reed 1 is attached or joined to the core or slug 3 which is of remanent high coercivity material and is energised by the coil 4 which is connected to a source of electrical pulses of reversible polarity. As before the contacts 5, 6 have a permanent magnet associated therewith with poles 7 and 8 of opposite polarity. The contacts of the reed 1 and 1a and the contacts 5 and 6 are advantageously coated with gold or other precious metal and this is also the case with the contacts in other configurations shown in the drawings. In the construction of FIGURE 5 it will be seen that pulses applied to the reed 1 do not pass through the core 3 thereby eliminating any possibility that such pulses affect the remanence of the core and the reed itself.

FIG. 6a shows schematically a modification of the invention. In this arrangement a rod or pellet 27 of remanent material is freely mounted within the coil 28 which is connected to a source (not shown) of reversible electrical pulses. Fixed permanent magnets 29, 30 are located endwise to the pellet 27 the poles of the said magnets directed to the pellet 27 at either end being of like polarity. A flexible connection 31 is provided from the pellet, and connections 32 and 33 are provided from each of the permanent magnets.

In this arrangement it is envisaged (as in FIG. 4) that the magnet elements 27, 29 and 30 are themselves rendered of properties as electrical conductors, by the application of suitable metallic coatings, and are each equipped with connection wires 32, 33 and 31. The relevant terminations, 34, and 35 for the coil, 36, 37 and 38 for the switch are marked upon the drawing.

In considering the structure as above described, and as illustrated in FIG. 6a, it will be observed that, in the absence of any magnetic polarization in the pellet 27, the mechanism will be in a state of unstable equilibrium.

When a D.C. current pulse (of duration and magnitude sufficient to induce magnetic polarization of pellet 27) is applied to the coil terminations 34 and 35 the pellet will be influenced to move by mutual interaction of the magnetic fields in all magnetic members.

The direction of the pellet movement will be dependent upon the polarity of the applied voltage and the movement will result in adhesion of the pellet 27 to either magnet 29 or magnet 30.

Correspondingly, there will be effected a connection between either terminations 36 and 37 or terminations 37 and 38, comprising the switching function of the mechanism.

Reversal of the applied the voltage polarity will result in reversal of the connection state, and, in either case, the connection will be maintained subsequent to cessation of the energizing pulse.

Since the pellet 27 is constructed from a material of high magnetic remanence the energizing pulse duration need be related only to the requirement for excitation of an adequate magnetic field in that component.

Since that excitation will result in permanent polarization the transit time of movement may be disregarded and the movement will always continue regardless of the subsidence of the energizing pulse.

When a switching state is established in the mechanism that state will be stable to the extent that, even if the "pellet" is forcibly disturbed from the established position, that position will be resumed when the disturbing force subsides.

Figure 6B:
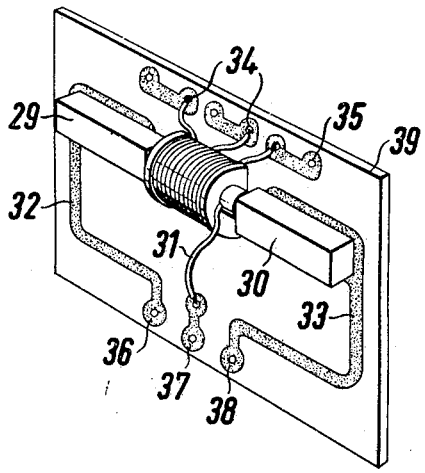

In FIG. 6b a practical arrangement for a simple bipolar switch is illustrated.

In this sketch the mechanism is conceived as being based upon a printed-circuit board 39. The copper tracks upon the board provide the requisite connections and the mounting facilities for the components of the system.

The coil 28 is envisaged as containing a multi-filar winding to facilitate switching of energizing current.

The magnetic components, 27, 29 and 30 may be coated with precious metal to enhance their properties as contacts.

The whole mechanism may be enclosed within a compartment to afford protection and further enhancement of the contact qualities in the switch. This compartment may advantageously be filled with a suitable oil for purposes of coil cooling and contact efficiency.

In more sophisticated arrangements the electromagnet coil may be specially wound to suit particular requirements and the basic mechanism may be in multiple.

Figure 7A:
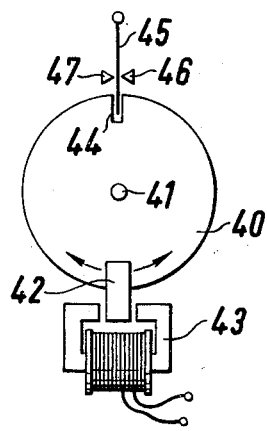
FIGS. 7a and 7b are perspective views of a further modification.

Referring to FIG. 7a it will be observed that the mechanism consists of a rotary disc 40 mounted upon and free to rotate upon a pivot pin 41.

A small permanent magnet 42 is attached to rotor 40 in fixed arrangement.

An electromagnet assembly 43, having convergently opposed pole faces in the core member, is positioned such that one end of the permanent magnet 42 is suspended between the electromagnet poles and is free to move between those poles.

A slot 44 is provided in the edge of rotor disc 40, such as to facilitate entry of a flexible contact strip 45 forming the movable contact of a bi-polar contact set 46, 47.

The core piece of electromagnet 43 is, constructed from a material of high remanent property and with coercivity properties such as to facilitate polarity inversion at relatively low current levels.

The permanent magnet 42 should possess high remanence and high coercivity.

In considering the structure as above described, and as illustrated in FIG. 7a, it will be observed that, in the absence of any magnetic field from the electromagnet 43, the mechanism will be in a state of unstable equilibrium when first assembled.

When a D.C. current pulse (of duration and magnitude sufficient to induce magnetic polarization in the core of electromagnet 43) is applied to the coil terminations the permanent magnet 42 will be subjected to repulsion and attraction forces from each of the electromagnet poles.

This effect will result in rotary movement of the disc 40 and, correspondingly, a switch contact closure will result.

Also, when the relative physical parameters are appropriately adjusted, the movement will result in magnetic adhesion of the static and rotary magnet poles, so that the connection established will be stable and independent of sustaining electrical energy.

If a second current pulse, of opposite polarity to the pulse previously employed, be applied to the energizing coil the physical state of the switch will be reversed.

The duration and magnitude of the energizing pulses need be related only to the requirements for excitation of an adequate magnetic field in the remanent of electromagnet 43.

Since this excitation results in permanent polarization the transit time of movement may be disregarded, and the movement will always continue regardless of the subsidence of the energizing pulse.

When a switching state is induced in the mechanism that state will be stable to the extent that, even if the rotor is forcibly disurbed from the established position, the position will be resumed when the disturbing force subsides.

Figure 7B:
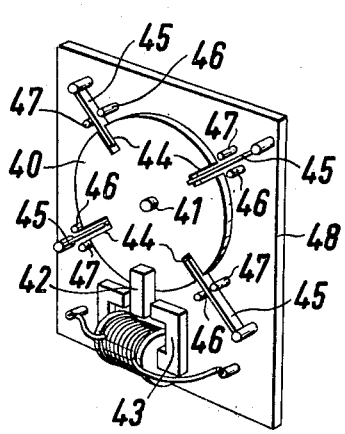

In FIG. 7b a practical arrangement for a "four-pole changeover" switch is illustrated. In this sketch the mounting board 48 is conceived as comprising a printed circuit.

The rotor disc 40 might be constructed from laminated insulating board or plastic material.

The contact sets may be constructed from conventional materials, and the magnetic elements of the mechanism may be of a very simple nature.

The operation of the mechanism is as described in the foregoing, relative to the FIG. 7a.

Fore more sophisticated applications the electromagnet coil arrangement may be varied and the contact system may be extended.

It will be understood that in FIG. 7a and 7b the permanent magnet 42 may be arranged to operate output contacts directly instead of through the agency of the rotor disc.

Figure 8:
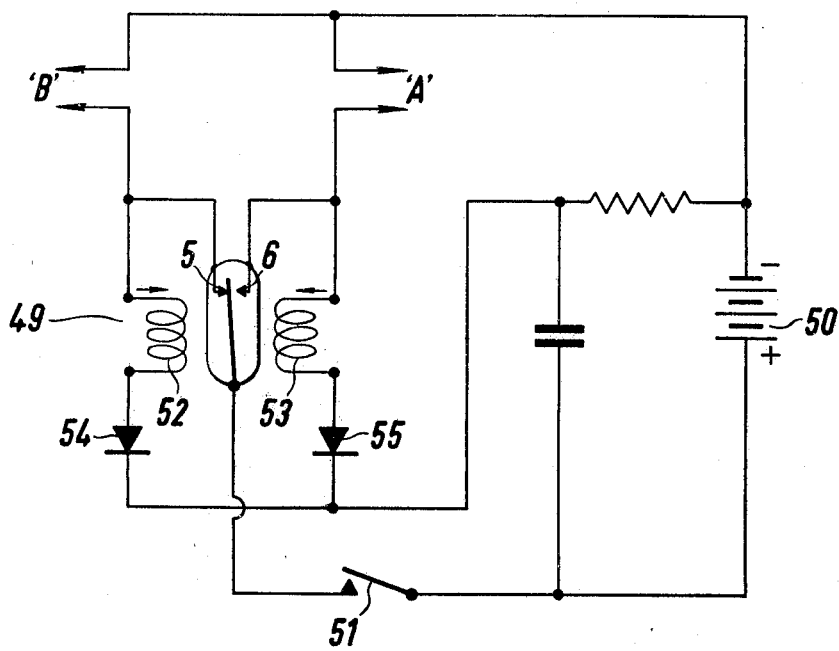
FIG. 8 shows the bistable switch of the invention operating through its own contacts.

Referring now to FIG. 8 connections are shown whereby a device 29 in accordance with the invention may be caused to operate through its own contacts. This device may be in accordance with that shown in any of the preceding figures. Pulses are applied from a source 50 every time trigger switch 51 is closed. The device as shown in FIGURE 8 is in the position that when switch 51 was last closed contact 5 was closed sending a signal B out. From contact 5 a pulse travels through coil 52 on closure of switch 51 to reverse polarity and switch reed 1 over to contact 6 and to send a signal A out and on closure of switch 51 again the procedure is reversed through coil 53. Diodes 54, 55 prevent any undesirable feedback.

We claim:

1. A bistable electromagnetic switch comprising at leastt one pair of fixed contacts and a contact member movable into engagement with either of said contacts to close said contact including an elongated pellet of remanent material, said pellet being freely movable within at least one inductive coil, first means applying a magnetic field of fixed polarity to at least part of said movable contact member, including magnet contact means at each end of said pellet, said magnet means having poles of like polarity facing said ends and said switch including electrical connections from said pellet and each of said magnet means, second means applying a magnetic field of reversible polarity to said movable contact member, said second means including remanent core means and coil means providing electrical pulses of reversible polarity to affect said remanent core means, whereby said movable contact member may be switched to either one of said fixed contacts in latching relation.

2. A switch according to claim 1 including electrical connections between said movable contact and at least one of said pair of contacts and one side of said of said coil means whereby the switch is caused to operate by passing a pulse through said coil from its own contacts.

3. A switch according to claim 1, said contact and coil structure being sealed in an oil bath.

4. An electromagnetic switch bistable in two closed contact positions comprising:
 a movable magnet member of fixed polarity mounted in the field of a magnetic system having a core of remanent material and at least one inductive coil,
 means for passing through said core electrical pulses of reversible polarity, one pole of said movable member engaging one or other of said contacts in latching relation,
 a rotor disc of non-magnetic material in engagement with said moving member, and
 means on said disc for engaging at least one of said contact elements in latching relation in two contact positions.

References Cited

UNITED STATES PATENTS

| | | | |
|---|---|---|---|
| 2,264,022 | 11/1941 | Ellwood | 335—154 |
| 2,907,846 | 10/1959 | Wilhelm | 335—151 |
| 3,008,021 | 11/1961 | Pollard | 335—57 |

(Other references on following page)

UNITED STATES PATENTS

| | | | |
|---|---|---|---|
| 3,254,327 | 5/1966 | Freimanis et al. | 335—79 X |
| 2,397,116 | 3/1946 | Armstrong. | |
| 3,059,075 | 10/1962 | Peek | 335—154 |
| 2,710,895 | 6/1955 | Frederickson | 200—150 X |
| 2,802,078 | 9/1957 | Martin | 200—87 |
| 2,830,148 | 4/1958 | Barger | 200—87 |
| 2,866,870 | 12/1958 | Smiley | 200—93 |
| 3,002,067 | 9/1961 | Baldwin | 200—87 |
| 3,128,418 | 4/1964 | Zupa | 200—87 |

FOREIGN PATENTS 559,453  5/1943  Great Britain.

BERNARD A. GILHEANY, Primary Examiner

R. N. ENVALL, Jr., Assistant Examiner

U.S. Cl. X.R.

335—153